United States Patent [19]

Hatori et al.

[11] Patent Number: 4,677,479
[45] Date of Patent: Jun. 30, 1987

[54] SYSTEM FOR RE-QUANTIZATION OF CODED PICTURE SIGNALS

[75] Inventors: Yoshinori Hatori, Kawasaki; Masahide Kaneko, Yokohama, both of Japan

[73] Assignee: Kokusai Denshin Denwa Kabushiki Kaisha, Nishishinjuku, Japan

[21] Appl. No.: 702,786

[22] Filed: Feb. 19, 1985

[30] Foreign Application Priority Data

Feb. 28, 1984 [JP] Japan .................................. 59-35298

[51] Int. Cl.⁴ ......................... H04N 7/12; H04N 1/40
[52] U.S. Cl. .................................... 358/135; 358/133; 358/260; 382/50
[58] Field of Search ............... 358/133, 135, 138, 260, 358/160, 166; 382/50

[56] References Cited

U.S. PATENT DOCUMENTS

| | | | |
|---|---|---|---|
| 4,204,227 | 5/1980 | Gurley | 358/133 X |
| 4,225,885 | 9/1980 | Lux et al. | 382/56 X |
| 4,238,768 | 12/1980 | Mitsuya et al. | 358/135 |
| 4,393,452 | 7/1983 | Sekigawa | 382/50 X |
| 4,494,144 | 1/1985 | Brown | 358/133 |

Primary Examiner—E. A. Goldberg
Assistant Examiner—Patrick W. Foster
Attorney, Agent, or Firm—Robert E. Burns; Emmanuel J. Lobato; Bruce L. Adams

[57] ABSTRACT

A coded picture signal re-quantization system, in which a parameter such as a variance or a mean value of picture element values in a region to be re-quantized is calculated on the basis of sub-sampled picture element values and, according to this parameter, a quantizer is adaptively varied for each region and, further, quantization of thinned-out picture elements is performed or stopped as required, thereby effecting conditional re-quantization.

6 Claims, 10 Drawing Figures

SYSTEM FOR RE-QUANTIZATION OF CODED PICTURE SIGNALS

BACKGROUND OF THE INVENTION

The present invention relates to a coded picture signal requantization system for high efficiency coding of picture signals of television transmission, video conference, video telephone and so forth.

The simplest method that has been employed for decreasing the total number of coding bits is to roughly sample picture signals for thinned-out coding of a picture and to interpolate the thinned-out picture elements during decoding. For example, by thinning out every other picture element in one line and thinning out every other line, the number of picture elements to be coded is reduced down to ¼, permitting the reduction of the number of bits required for coding down to ¼.

With the above method, however, resolution of the picture signal is impaired, resulting in blurring of the decoded picture.

Conventionally known as a solution to this problem is a system called a "two-channel coder" (W. F. Schreiber et al., "A Two-Channel Picture Coding System", IEEE Transactions on Communications, December 1981, Vol. COM. 29, Nr. 12, P 1841-P 1858). This method is characterized by separating picture signals into high-frequency and low-frequency components for coding. In this case, it is also possible to reproduce the low-frequency component of the picture by thinned-out picture signals, and it can also be considered that the high-frequency component of the picture contains information for providing resolution of the picture, such as an edge or the like. However, this method does not involve adaptive quantization.

SUMMARY OF THE INVENTION

An object of the present invention is to provide a coded picture signal re-quantization system which permits the retention of resolution of the original picture even in the thinned-out coding, thereby obviating the abovesaid defect of the prior art.

The present invention is characterized in that a parameter such as variance or a mean value of picture element values in a region to be re-quantized is calculated on the basis of sub-sampled picture element values and, according to this parameter, a quantizer is adaptively varied for each region and, further, quantization of thinned-out picture elements is performed or stopped as required, thereby effecting conditional re-quantization.

BRIEF DESCRIPTION OF THE DRAWINGS

The present invention will be described in detail below with reference to the accompanying drawings, in which.

DETAILED DESCRIPTION

Figure 1:
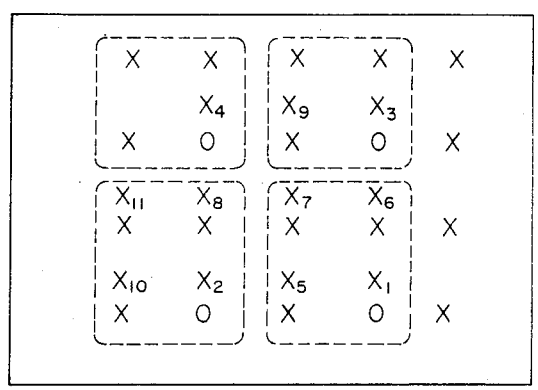
FIG. 1 is a diagram showing the positional relationships of picture elements explanatory of the invention.

The present invention will hereinafter be described in detail. The present invention utilizes signal values of sub-sampled picture elements. A sub-sample pattern in this case is optional, but the following description will be given in connection with an example in which alternate picture elements are sub-sampled in alternate lines, as indicated by $x_1$, $x_2$, $x_3$, $x_4$, . . . in such a picture element arrangement as shown in FIG. 1. In this case, picture element values of picture elements $x_5$, $x_6$ and $x_7$ in the thinned-out region are requantized by a quantizer which is determined on the basis of a parameter obtained with the values of the picture elements $x_1$ to $x_4$, and thereafter this block is coded, for two picture elements displaced in a sequential order for each coding.

In this case, the block containing the picture elements $x_1$ and $x_5$ to $x_7$ is considered as a current region, and a mean value M in the current region and an interpolation value $I_i$ for each picture element $x_i$ are determined as follows:

$$M = (x_1 + x_2 + x_3 + x_4)/4 \tag{1}$$

$$I_5 = (x_1 + x_2)/2 \tag{2}$$

$$I_6 = (x_1 + x_3)/2 \tag{3}$$

$$I_7 = (x_1 + x_2 + x_3 + x_4)/4 \tag{4}$$

Further, in order to represent the activity (the degree of flatness) of the current region on the basis of the adjoining picture element values $x_1$ to $x_4$ already known, a variance S and an activity value A are determined in such forms as follows:

$$S = \sqrt{\sum_{i=1}^{4} (x_i - M)^2 / 4} \tag{5}$$

$$A = \sum_{i=1}^{4} |x_i - M|/4 \tag{6}$$

Incidentally, it is also possible to use, as the value representing the activity, another expression such, for example, as follows:

$$A' = Max\ x_i - Min\ x_i \tag{7}$$

(where Max $x_i$ and Min $x_i$ are the maximum value and the minimum value, respectively, among $x_1$ to $x_4$).

The characteristics of the quantizer for the picture elements $x_5$ to $x_7$ are determined using these values. For instance, letting a quantizing threshold value be represented by $Th_1$ and representative output values after quantization by $R_1$ and $R_2$, they are determined as follows:

$$Th_1 = M \quad (8)$$

$$R_1 = M + a_1 S \quad (9)$$

$$R_2 = M - a_2 S \quad (10)$$

(where $a_1$ and $a_2$ are suitable coefficients, for example, $a_1 = a_2 = 1$). Further, the picture element $x_i$ (where $i = 5$ to 7) is subjected to such two-level quantization as follows:

$$\text{When } x_i \geq Th_1, \; x_i' = R_1 \quad (11)$$

and $$\text{When } x_m < Th_1, \; x_i = R_2 \quad (12)$$

(where $x_i'$ is a coded value of $x_i$). By this, it is possible to represent density information of a concerned picture element together with resolution information by the use of a smaller number of bits than is needed for PCM coding the density information.

While in the above example the quantization takes place at two levels, the number of levels can also be increased. For example, by setting $$Th_1 = M + a_3 S \quad (13)$$

$$Th_2 = M - a_4 S \quad (14)$$

(where $a_3$ and $a_4$ are suitable coefficients, such as $a_3 = a_4 = \frac{1}{2}$)

$$R_1 = M + a_5 S \quad (15)$$

$$R_2 = M \quad (16)$$

$$R_3 = M - a_6 S \quad (17)$$

(where $a_5$ and $a_6$ are suitable coefficients, such as $a_5 = a_6 = 3/2$), quantization can be effected at odd-numbered levels about zero. It is also possible to perform quantization using more levels. Moreover, it is possible to employ the interpolation value I in place of the mean value M and the activity value A in place of the variance S.

On the other hand, at the decoding side, the means value M and the variance S are calculated on the basis of the signal values of the picture elements $x_1$ to $x_4$ and values of $x_5'$ to $x_7'$ are decoded in accordance with quantization level indicating information for the picture elements $x_5$ to $x_7$.

A detailed description will be given, with reference to the drawings, of an embodiment of the picture signal coding system of the present invention.

Figure 2:
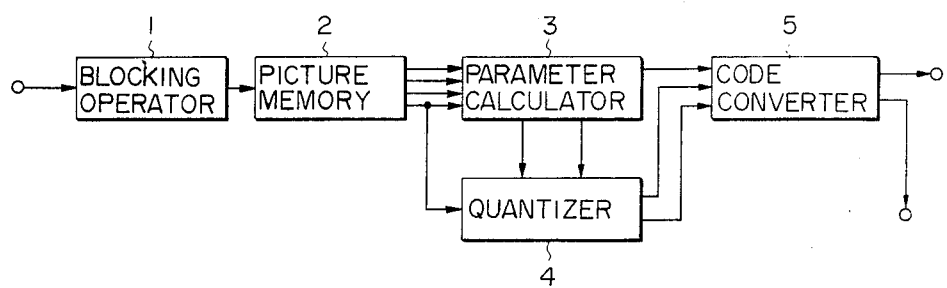
FIG. 2 is a block diagram illustrating an embodiment of the present invention.

FIG. 2 is a block diagram illustrating the encoding side in the coding system which retains resolution according to the present invention. In FIG. 2, reference numeral 1 indicates a blocking operator for rearranging picture signals in units of blocks so as to facilitate subsequent processing; 2 designates a picture memory for storing the picture signals; 3 identifies a parameter calculator for calculating the mean value and variance in the current region on the basis of subsampled picture element values; 4 denotes a quantizer for quantizing signal values of thinned-out picture elements in accordance with the values obtained by the parameter calculator; and 5 represents a code converter for converting the coded signal values into codes for storage or transmission. The parts 3 and 5 are characterized part of the present invention.

Figure 3:
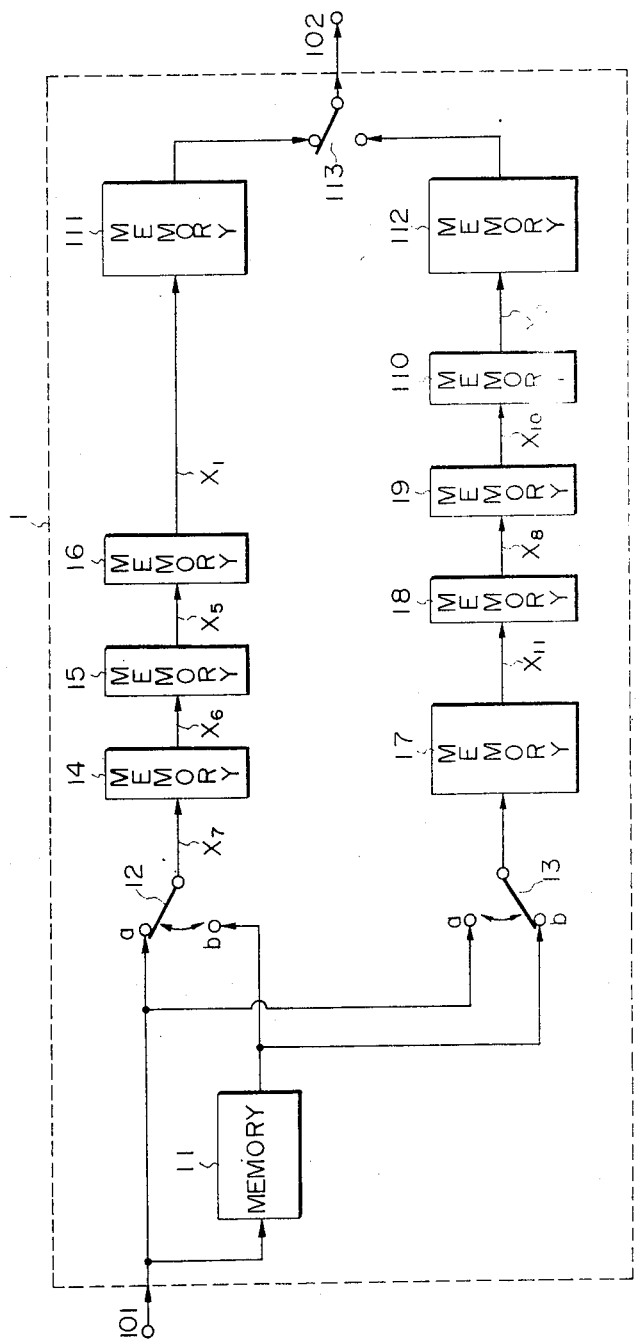
FIG. 3 is a block diagram illustrating an example of the arrangement of a blocking operator used in the embodiment of FIG. 2.

A description will be given of an example of the arrangement of each part. FIG. 3 is a diagram illustrating an example of the arrangement of the blocking operator 1 used in FIG. 2. In FIG. 3, there is shown a method for implementing the blocking operation by which a total of four picture elements of two picture elements x two lines, shown in FIG. 1, are consolidated into a block. In FIG. 3, reference numeral 11 indicates a memory for storing picture signals of one line and two picture elements; 14, 15, 16, 18, 19 and 110 designate memories for providing a delay for a period of time of one picture element; 17 identifies a memory for providing a delay for a period of time of two picture elements; and 111 and 112 denote memories for storing picture signals of one line. Reference numerals 12 and 13 represent switches for selecting input picture elements which are consolidated into the block. For example, when the picture elements $x_1$ and $x_5$ arrive at the side a, the switch 12 is connected to the side a, and when the picture elements $x_6$ and $x_7$ arrive at the side b next, the switch 12 is changed over to the side b. A similar operation is performed by the switch 13 as well, by which at a certain point of time, values of the picture elements $x_7$, $x_6$, $x_5$, $x_1$ and $x_{11}$, $x_8$, $x_{10}$, $x_2$ are read out at input/output points of the memories 14 to 16 and 18 to 110, as shown in FIG. 3. By the above operations, blocks, each covering two lines, are formed every other line in a one-line scanning period in such a manner that they do note overlap with one another, as shown in FIG. 1. Accordingly, values of the respective blocks are stored in the memories 111 and 112, each having a storage capacity of one line, and are read out via a switch 113 which is changed over to the above memories alternately with each other during a two-line period. By the above, values of blocked picture elements are sequentially read out at an output 102, and in a period in which picture data of two lines are input, picture block data of two lines are sent out successively to each of the succeeding circuits.

Figure 4:
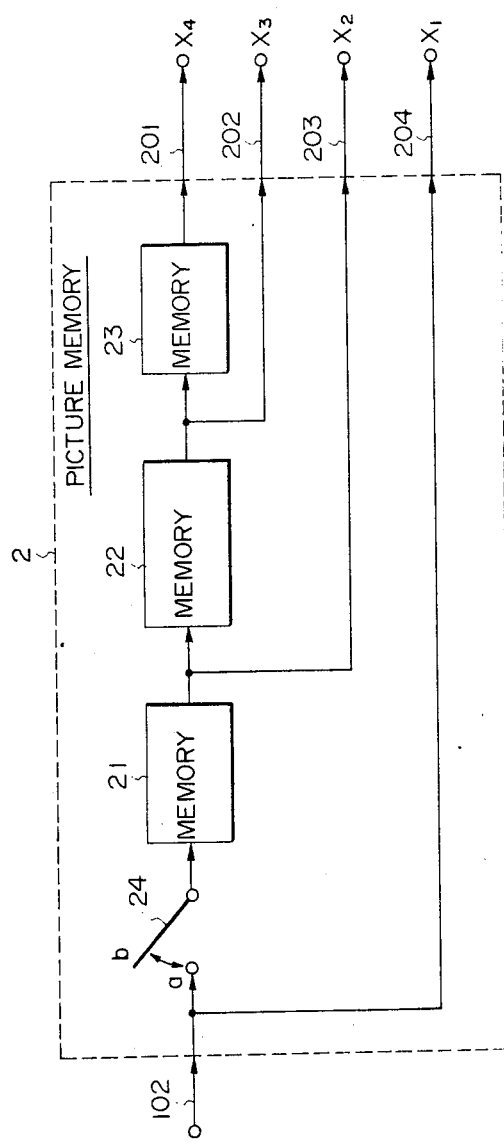
FIG. 4 is a block diagram illustrating an example of the arrangement of a picture memory used in the embodiment of FIG. 2.

FIG. 4 is a diagram illustrating an example of the arrangement of the picture memory 2 used in FIG. 2. In FIG. 4, reference numerals 21 to 23 indicate memories of such storage capacities as shown in Table 1 and capable of storing picture signal values.

TABLE 1

| Memory Number | Storage Capacity |
| --- | --- |
| 21 | B/4 |
| 22 | (2L - B)/4 |
| 23 | B/4 |

In Table 1, B indicates one block and L one line. A switch 24 is one that inputs only the leading picture element values (for example, the picture elements $x_1$, $x_2$, $x_3$, $x_4$, etc.) of the respective blocks at intervals of picture elements to the succeeding memories. In the subsequent processing, only values of the picture elements $x_2$ to $x_4$ are needed in addition to the picture elements in the current block, and values of the other picture elements are unnecessary. Accordingly, only when supplied with the leading picture element of each block, the switch 24 is connected to the side a to store the picture element value in the memory 21 and the others, and in the other cases, the switch 24 is connected to the side b, supplying no input to the memories. This reduces the total capacity of the picture memory required. Incidentally, the memories 21 to 23 are read out for each block time slot (at intervals for four picture elements). Consequently, the amount of delay by these memories is four times the value given in Table 1. With the above arrangement, for instance, when the picture element $x_1$ of the current block is applied to the input 102, signal values of the picture elements $x_4$, $x_3$, $x_2$ and $x_1$ are provided at outputs 201 to 204, respectively.

Figure 5:
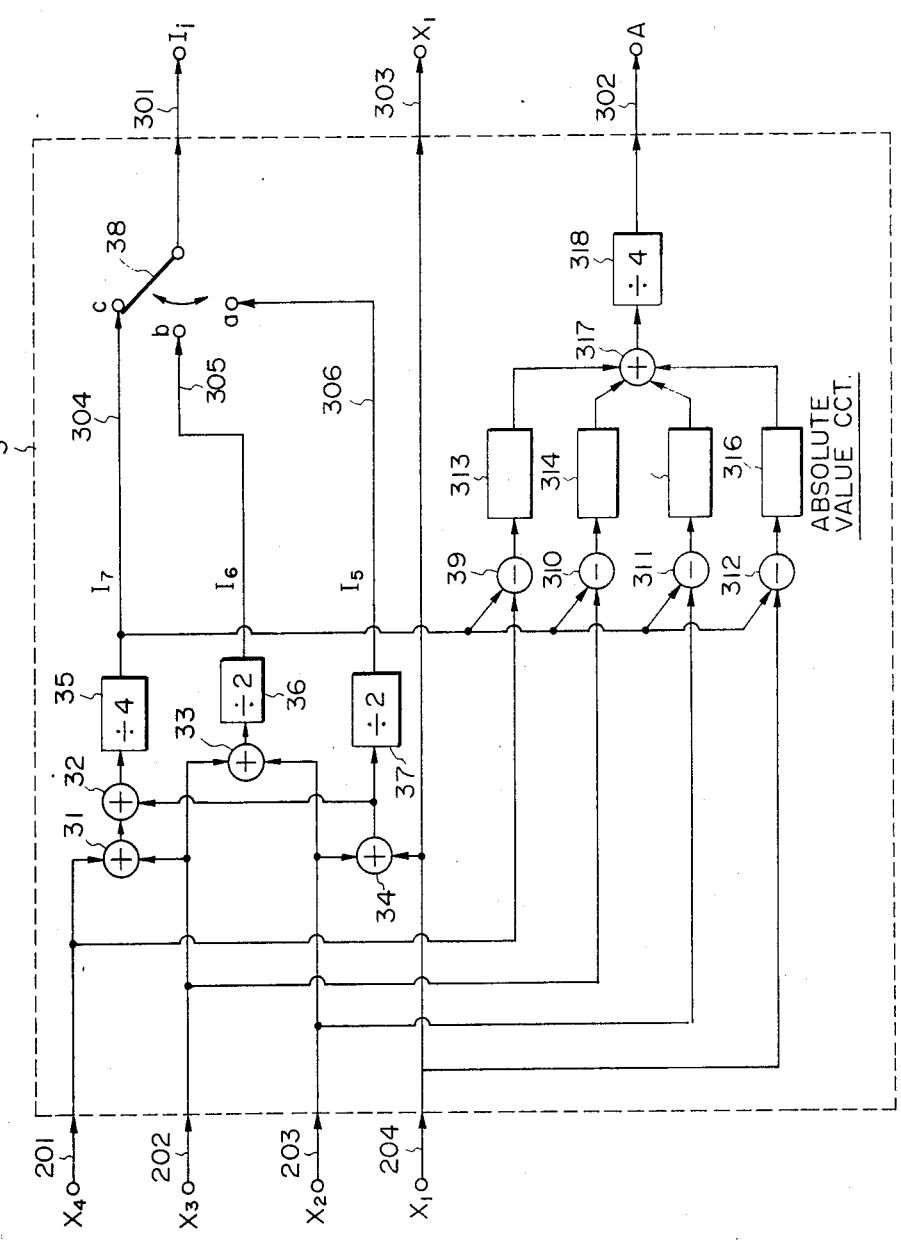
FIG. 5 is a block diagram illustrating an example of the arrangement of a parameter calculator used in the embodiment of FIG. 2.

FIG. 5 is a diagram illustrating an example of the arrangement of the parameter calculator 3 used in FIG. 2. In the present invention, various parameters can be employed as required, but this example will be described in connection with the case of using the following parameters:

$$Th_1 = I_i + a_3 A \tag{18}$$

$$Th_2 = I_i - a_4 A \tag{19}$$

$$R_1 = I_i + a_5 A \tag{20}$$

$$R_2 = I_i \tag{21}$$

$$R_3 = I_i - a_6 A \tag{21}$$

(where $I_i$ is an interpolation value for the picture element $x_i$, and the others are the same as those in Eqs. (13) to (17) but $a_3 = a_4$ and $a_5 = a_6$). Therefore, FIG. 5 shows the case of calculating the interpolation value $I_i$ of each picture element and the activity value A of the current block.

Now, let it be assumed that the picture elements $x_1$ to $x_4$ are applied to the inputs 201 to 204, respectively. Reference numerals 31 to 34 indicate adders and 35 to 37 dividers, each of which performs a division by such a value shown in FIG. 5. Accordingly, interpolation values $I_7$ to $I_5$ calculated by Eqs. (2) to (4) are provided at outputs 304 to 306, respectively. Reference numeral 38 designates a switch for reading out these interpolation values in a sequential order, and it is switched between a, b and c at the timing of the second, third and fourth picture elements in the current block, selecting the output values. Thus the interpolation values are delivered at the output 301 in an order of $I_5$, $I_6$ and $I_7$.

Reference numerals 39 to 312 indicate subtractors; 313 to 316 designate circuits for obtaining absolute values of their outputs; 317 identifies an adder; and 318 denotes a divider which performs a division by "4". With this circuit arrangement, the activity value A of the current region, shown by Eq. (6), is provided at the output 302. At the output 303, there is provided the signal value $x_1$ of the sub-sampled picture element in the current block.

Figure 6:
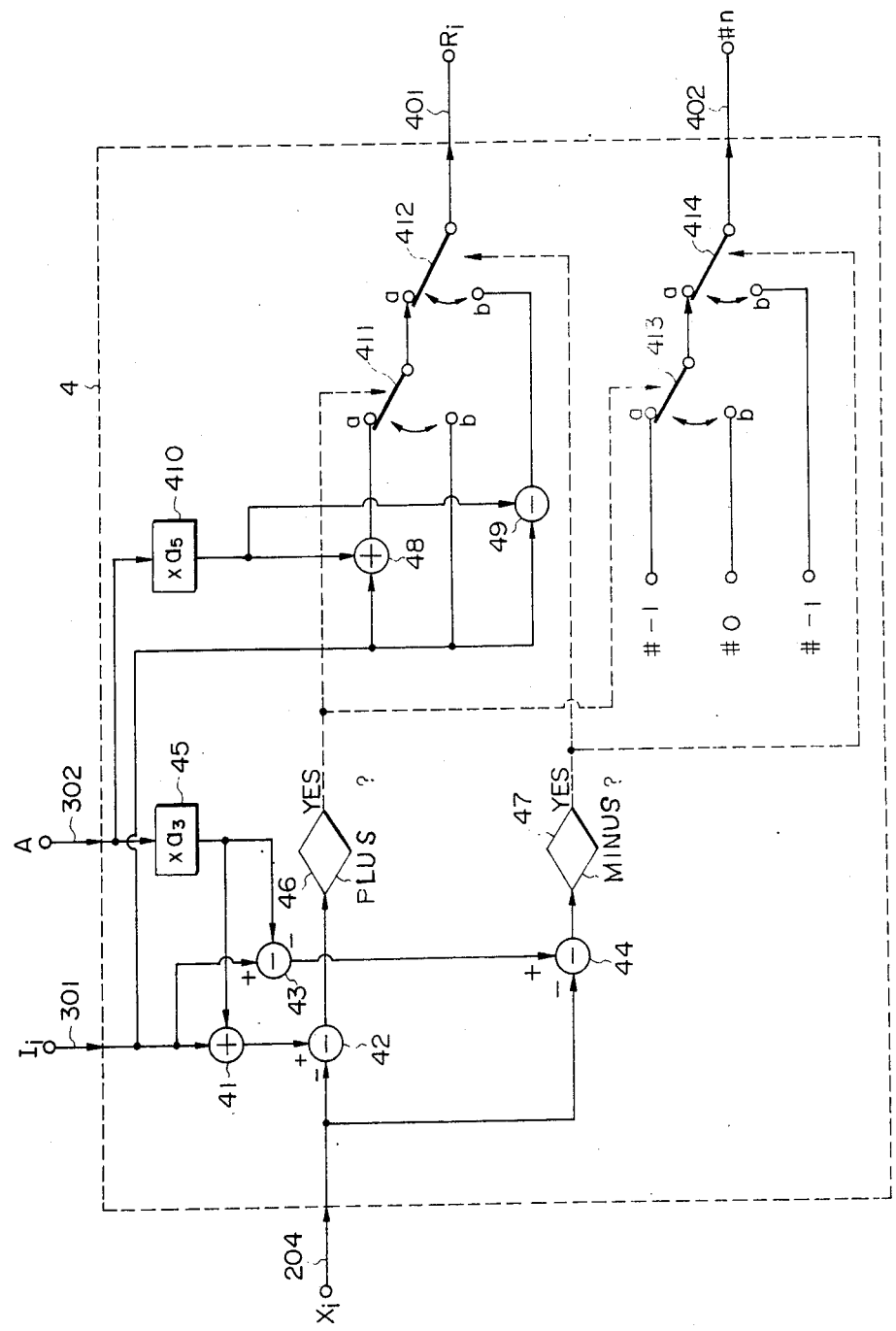
FIG. 6 is a block diagram illustrating an example of the arrangement of a quantizer used in the embodiment of FIG. 2.

FIG. 6 is a diagram illustrating an example of the arrnagement of the quantizer 4 utilized in FIG. 2. In FIG. 6, the interpolation value $I_i$ and the activity value A are provided to the inputs 301 and 302, respectively. On the other hand, the picture elements $x_1$, $x_5$, $x_6$ and $x_7$ in the current block are provided to the input 204. However, the result of operation of the quantizer 4 in the period in which the leading picture element $x_1$ is being applied is not utilized in the present invention. When the second and succeeding picture elements $x_5$ to $x_7$ are applied to, the interpolation values $I_5$ to $I_7$ are applied to at the same timing as the picture elements, and on the basis of the interpolation values, the input picture element values are quantized.

In FIG. 6, reference numerals 41 to 44 indicate circuits, each performing an addition or subtraction, as shown; 45 designates a multiplier for multiplying the input thereto by a suitable coefficient $a_3$; and 46 and 47 identify circuits for deciding whether the result of subtraction is plus or minus. With the above arrangement, when the value of the input picture element $x_1$ is larger than the value $(I_i + a_3 A)$, the YES output of the decision circuit 46 is turned ON and when it is smaller than the value $(I_i - a_3 A)$, the YES output of the decision circuit 47 is turned ON, thereby selecting a representative quantized output.

In FIG. 6, reference numerals 48 and 49 indicate an adder and a subtractor, respectively; 410 designates a multiplier for multiplying the input thereto by a coefficient $a_5$; and 411, 412 and 413, 414 identify switches for selecting the representative quantized value and the quantization level number. The switches 411 and 413 are connected to the side a or b depending upon whether the decision circuit 46 is in the ON or OFF state, and the switches 412 and 414 are connected to the side b or a depending upon whether the decision circuit 47 is in the ON or OFF state. By this, any one of the quantized representative values $(I_i + a_5 A)$, $(I_i)$ and $(I_i - a_3 A)$ is provided to an output 401 and the quantization level number is provided to an output 402. Incidentally, in the above arrangement, each quantized representative value is calculated so as to obtain a decoded value, but if this value is not needed at the encoder side, the circuits 48 to 410 and 401 are unnecessary.

Figure 7:
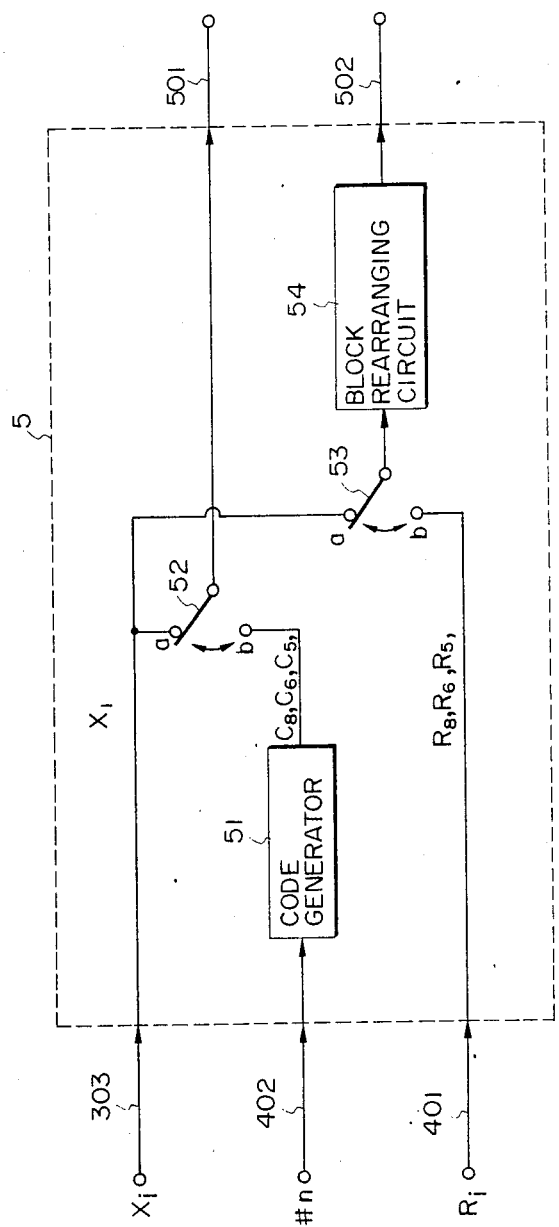
FIG. 7 is a block diagram illustrating an example of the arrangement of a code converter used in the embodiment of FIG. 2.

FIG. 7 illustrates an example of the arrangement of the code converter 5 used in FIG. 2. In FIG. 7, reference numeral 51 indicates a code generator for converting the quantization level number into a code for transmission or storage, for instance, a two-bit pattern such as "00", "01" or "10". The code generator is implemented by a read-only memory (ROM). A switch 52 is a switch for alternately reading out the sub-sampled picture element value $x_1$ and coded patterns $c_5$, $c_6$ and $c_7$ indicating the quantization level numbers corresponding to the picture elements $x_5$, $x_6$ and $x_7$, respectively. On the other hand, reference numeral 53 designates a switch for sub-sampled picture elements and quantized representative values of thinned-out picture elements alternately with each other, as is the case with the switch 52. Reference numeral 54 identifies a block rearranging circuit for rearranging the blocked picture elements into their normal order of scanning. Since the circuit 54 can be implemented by substantially the same arrangement as the blocking operator shown in FIG. 3 and by reversing the order of its operations, no detailed description thereon will be given.

Figure 8:
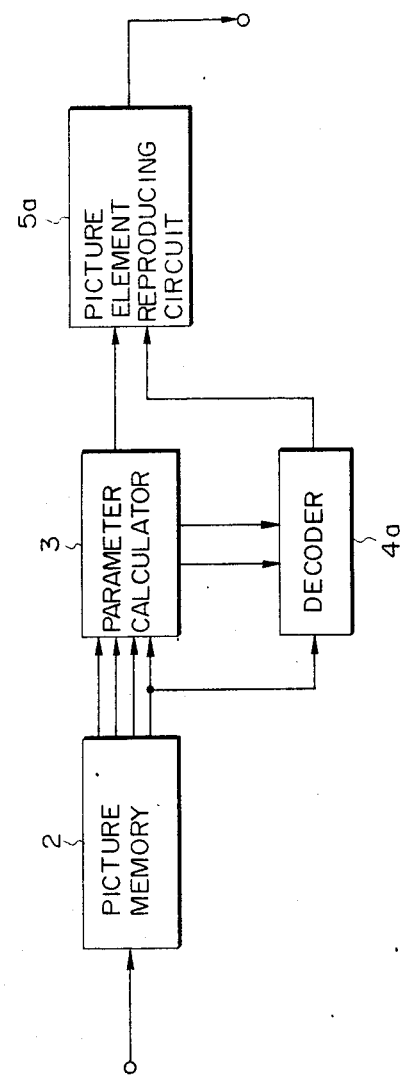
FIG. 8 is a block diagram illustrating an example of the arrangement of a decoder for decoding codes proceeded according to the present invention.

FIG. 8 is a diagram of a decoder for decoding picture signals coded according to the present invention. In FIG. 8, circuits identified by 2 and 3 are identical with the picture memory 2 and the parameter calculator 3 used in FIG. 2. Reference numerals 4a and 5a indicate a decoder and a picture element reproducing circuit, which perform functions corresponding to the circuits 4 and 5 in FIG. 2, respectively.

Figure 9:
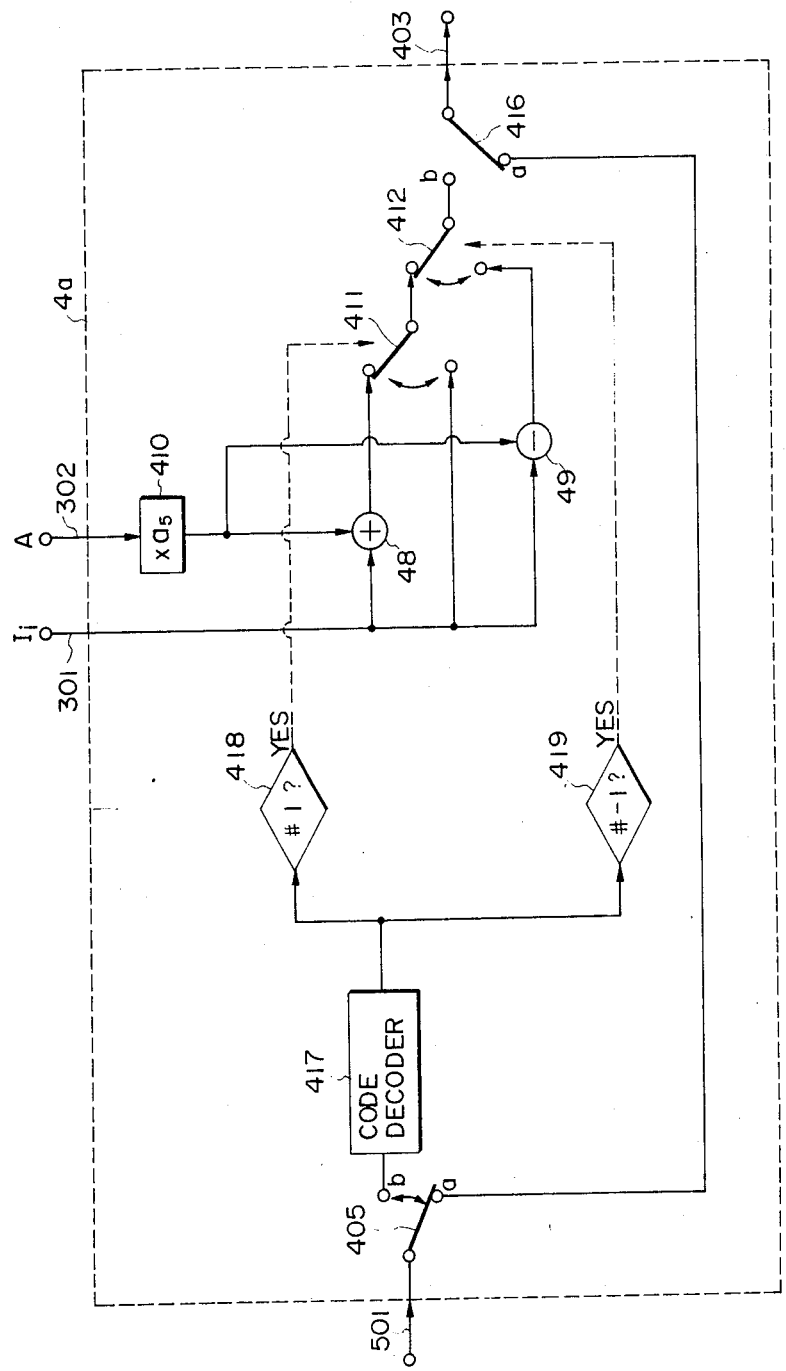
FIG. 9 is a diagram showing an example of the arrangement of a decoder for use in the arrangement shown in FIG. 8.

FIG. 9 is a diagram illustrating an example of the arrnagement of the decoder 4a employed in FIG. 8. In FIG. 9, reference numeral 417 identifies a circuit which implements a function corresponding to the code generator 51 used in FIG. 7, for converting coded codes into quantization level numbers, and which circuit is formed by a ROM as is the case with the code generator 51 in FIG. 7. Reference numerals 418 and 419 designate decision circuits which perform functions corresponding to the circuits 46 and 47 in FIG. 6. The other circuits 48 to 412 are all identical with those shown in FIG. 6.

On the other hand, the picture element reproducing circuit 5a in FIG. 8 is identical in construction with the code converter 5 shown in FIG. 7 except the circuits 402, 51, 52 and 501.

Figure 10:
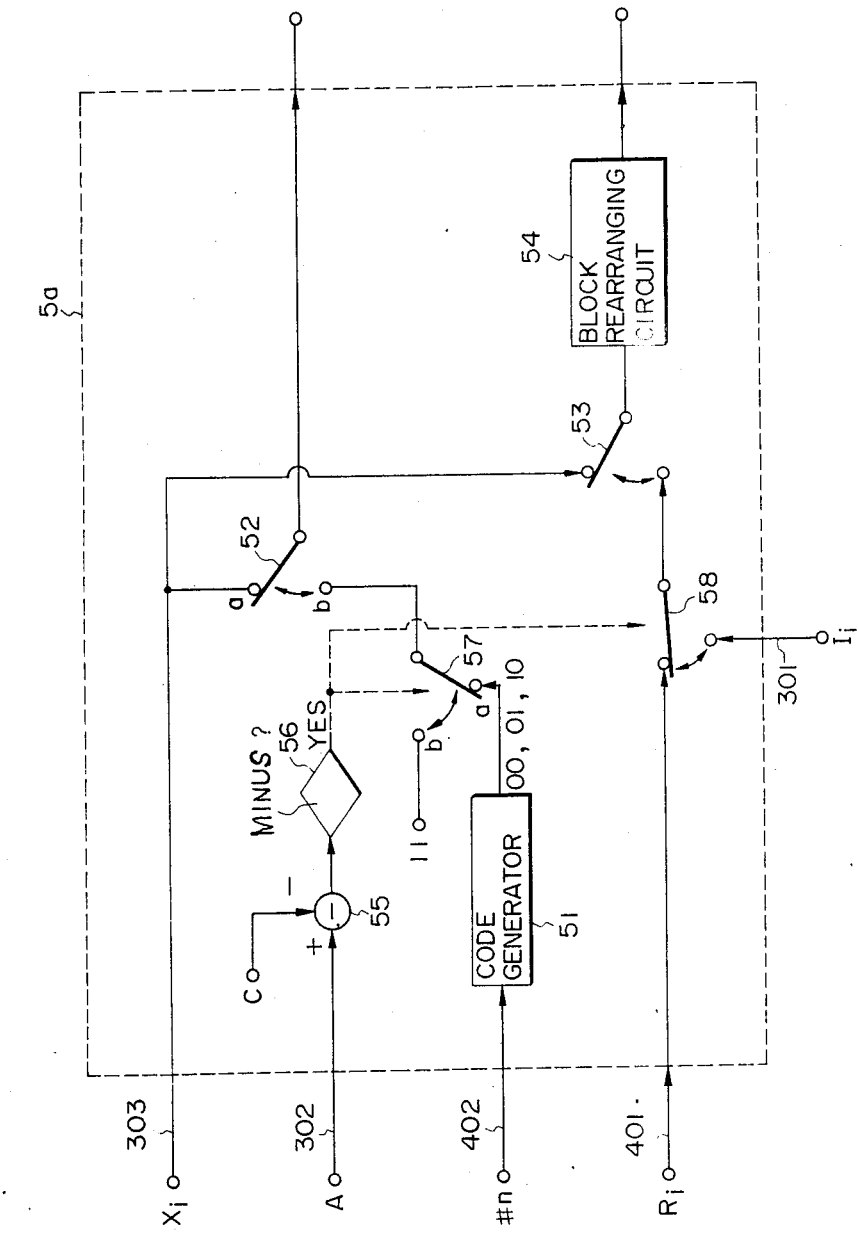
FIG. 10 is a block diagram illustrating another example of the arrangement of a coding circuit for use in the embodiment of FIG. 9.

Incidentally, the above description has been given in connection with the case of quantizing values of all thinned-out picture elements. However, for further raising the coding efficiency, it is effective, for example, to perform a conditional quantization based on the activity value A or variance S of the current block, as shown in FIG. 10. In FIG. 10, reference numeral 55 indicates a circuit which obtains a difference between the activity value A and a suitable threshold value C, and 56 a circuit which decides the magnitude of the difference. With this arrangement, if the activity value of the current block is smaller than the threshold value C, then a coding pattern "11" is used and the quantization level values of the picture elements $x_5$, $x_6$ and $x_7$ are not coded. Further, in this case, the interpolation value $I_i$ is employed as a reproduced value, which is selected by a switch 58. When the activity value A is greater than the threshold value C, a pattern "00", "01" or "10" is used and the quantization level numbers of the picture elements corresponding to the picture elements $x_5$, $x_6$ and $x_7$ are coded.

In the above the present invention has been described with regard to the case where sub-sampled picture elements, for example, $x_1$ to $x_4$ in FIG. 1, are PCM coded picture signals. In practice, however, the invention is also applicable to even if these picture elements are those subjected to, for instance, predictive coding or orthogonal transfer coding. Moreover, it is also possible to raise resolution in a stepwise manner by recurrently coding thinned-out picture elements through using coded picture elements $x_1$, $x_5$, $x_6$ and $x_7$ as newly sub-sampled picture elements.

As has been described above, the present invention provides a coding system according to which even if the number of bits necessary for coding picture signals is reduced, by the thinning-out of picture elements, down to about ½ or less the number of bits needed for conventional PCM coding, resolution can be held substantially unchanged.

We claim:

1. A coded picture signal re-quantization system comprising: a blocking operator for blocking coded picture signals for each region of a picture containing a predetermined number of picture elements; a region parameter calculator for calculating paramenters representative of the mean brightness and the state of density distribution of a region of a picture to be re-quantized on the basis of a selected picture element at a predetermined position in each adjoining region of the picture; and a re-quantizer for re-quantizing signal values of the other picture elements in the region by using at least one re-quantizing threshold value, and output representative values of a picture signal determined according to the parameters obtained from the parameter calculator.

2. A coded picture signal re-quantization system according to claim 1, characterized in that the parameters are at least one of an interpolation value I and a mean value M of the region to be re-quantized and at least one of variance S in the region and an activity value A corresponding to the variance S.

3. A coded picture signal re-quantization system according to claim 1, in which the quantizer comprises means for conditional quantization so that when the magnitude of the value of the variance S or activity value A is smaller than the magnitude of a suitable threshold value C, thinned-out picture elements are not coded.

4. A coded picture signal re-quantization system according to claim 2 or 3, characterized in that the quantization takes place using, as threshold values therefor, the mean value M and two quantization representative values $R_1$ and $R_2$ which are given by $R_1 = M + a_1 S$ and $R_2 = M - a_2 S$ (where $a_1$ and $a_2$ are suitable coefficients), respectively.

5. A coded picture signal re-quantization system according to claim 2 or 3, characterized in that the quantization takes place using, as threshold values therefor, the interpolation value I of each picture element in each region and two quantization representative values $R_1$ and $R_2$ which are given by $R_1 = I + a_1 S$ and $R_2 = I - a_2 S$ (where $a_1$ and $a_2$ are suitable coefficients), respectively.

6. A coded picture signal re-quantization system according to claim 2 or 3, characterized in that the quantization takes place using two quantization threshold values $Th_1$ and $Th_2$ which are given by $Th_1 = I + a_1 A$ and $Th_2 = I - a_2 A$ (where $a_1$ and $a_2$ are suitable coefficients), respectively, and three quantization representative values $R_1$, $R_2$ and $R_3$ which are given by $R_1 = I + a_3 A$, $R_2 = I$ and $R_3 = I - a_4 A$ (where $a_3$ and $a_4$ are suitable coefficients), respectively.

* * * * *